US006275229B1

(12) United States Patent
Weiner et al.

(10) Patent No.: US 6,275,229 B1
(45) Date of Patent: *Aug. 14, 2001

(54) COMPUTER USER INTERFACE FOR GRAPHICAL ANALYSIS OF INFORMATION USING MULTIPLE ATTRIBUTES

(75) Inventors: Michael Weiner, Webster; Thomas T. Chronis, Rochester, both of NY (US)

(73) Assignee: Manning & Napier Information Services, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/309,363

(22) Filed: May 11, 1999

(51) Int. Cl.[7] ............................. G06F 3/14; G06F 17/30

(52) U.S. Cl. .................... 345/339; 345/348; 345/349; 345/440; 345/968; 707/3; 707/6

(58) Field of Search ..................................... 345/339–340, 345/348–349, 357, 440, 968; 395/600, 603, 605–606; 707/3, 5–6

(56) References Cited

U.S. PATENT DOCUMENTS

| 5,579,471 | * | 11/1996 | Barber et al. ..................... 345/348 X |
| 5,636,350 | * | 6/1997 | Eick et al. ........................... 345/440 |
| 5,724,573 | * | 3/1998 | Agrawal et al. ................. 395/603 X |
| 5,790,121 | | 8/1998 | Sklar et al. ........................ 345/356 |
| 5,982,369 | * | 11/1999 | Sciammarella et al. ............ 345/349 |

FOREIGN PATENT DOCUMENTS 0 274 571   *   7/1988   (EP) .

* cited by examiner

Primary Examiner—Raymond J. Bayerl
Assistant Examiner—X. L. Bautista
(74) Attorney, Agent, or Firm—Townsend and Townsend and Crew LLP

(57) ABSTRACT

A method and apparatus for efficiently analyzing information on a computer is provided. The information contains information items where each information item has a plurality of attributes. The information is re-organized based on the attributes and displayed in graphical form on a computer display screen. By viewing the information in graphical form, a user can quickly analyze the information to determine trends or qualities. In addition, the graphical form provides a way for the user to quickly identify the information items most relevant to specific criteria.

10 Claims, 8 Drawing Sheets

400

Results (by Rank) for: I would like information about what industry experts and analysts are saying about the future of complete knowledge management solutions. 92 documents returned—404

1. DOCUMENTUM and IBM Announce Remarketing Agreement and Launch New
95% Alliance To Deliver Knowledge Management Solutions For Multiple Industries
Business Editors and Computer Writers · BUSINESS WIRE · 03/17/98 · 4 pages (900 words) · SUMMARY
PLEASANTON, Calif.--(BUSINESS WIRE)--March 17, 1998-- DOCUMENTUM(R) Inc.,
(NASDAQ:DCTM) a worldwide leader in enterprise document and knowledge management solutions for client/server and Web environments, and IBM Corp.

405 / 402

2. DOCUMENTUM and IBM Launch New Alliance To Deliver Knowledge Management
95% Solutions For Multiple Industries
Business Editors/Technology Writers · BUSINESS WIRE · 03/17/98 · 4 pages (890 words) · SUMMARY
PLEASANTON, Calif.--(BUSINESS WIRE)--March 17, 1998-- DOCUMENTUM(R) Inc.,
(NASDAQ:DCTM) a worldwide leader in enterprise document and knowledge management solutions for client/server and Web environments, and IBM Corp.

3. FULCRUM AND CAMBRIDGE TECHNOLOGY PARTNERS FORM ALLIANCE
95% AROUND DELIVERY OF KNOWLEDGE MANAGEMENT SOLUTIONS
CANADA NEWSWIRE · 04/14/98 · 5 pages (970 words) · SUMMARY
410 CAMBRIDGE, MA and OTTAWA, April 14 /CNW/ - Fulcrum Technologies Inc., a subsidiary of PC DOCS Group International Inc.

4. PeakSoft and InfoBuild Networks Sign Exclusive Licensing Agreement; InfoBuild
95% Targets Vertical Markets with NetMagnet Core Technology in $1.35 Million Deal with PeakSoft
Business Editors · BUSINESS WIRE · 03/31/98 · 3 pages (490 words) · SUMMARY
BELLINGHAM, Wash.--(BUSINESS WIRE)--March 31, 1998--PeakSoft Corporation (ASE:PKT, OTCBB:PEAFF), a leading developer of Internet productivity and communication software, today announced a strategic licensing agreement with InfoBuild Networks Inc.

5. Autonomy Launches New Knowledge Management Products to Help Companies
94% Leverage Employee Expertise, Late-breaking News and Existing Information Archives
Business Editors · BUSINESS WIRE · 02/17/98 · 6 pages (1460 words) · SUMMARY
SAN FRANCISCO--(BUSINESS WIRE)--Feb. 17, 1998--Autonomy, Inc. today announced its new knowledge 6. Watergate Software and Inference Corp. Announce Core Strategic Partnership
93% Business Editors & High Tech Writers · BUSINESS WIRE · 01/20/98 · 4 pages (640 words) · SUMMARY
Watergate Software, Inc. -- the leading OEM supplier of PC hardware diagnostic and system 7. Inference Offers Free Microsoft and Lotus Customer Self-Service Via the Web
93% Business Editors & Computer Writers · BUSINESS WIRE · 10/06/97 · 4 pages (690 words) · SUMMARY
Inference Corporation (NASDAQ:INFR), the leading provider of self-service and knowledge management solutions, today announced that during the month of October it will provide free use of four of its Case Solutions knowledge bases over the World Wide Web.

8. DOCUMENTUM to Acquire Workgroup Management Inc.; Acquisition of
92% Integration/Consulting Firm Enhances Solutions Approach for the Semiconductor and Electronics Markets
Business Editors/Computer Writers · BUSINESS WIRE · 10/15/97 · 4 pages (700 words) · SUMMARY
PLEASANTON, Calif.--(BUSINESS WIRE)--Oct. 15, 1997-- DOCUMENTUM(R) Inc., (NASDAQ:DCTM), a leader

| Modify Save Alert | Sort: % ↓ Rank | 1/1 12/31↓ Newest | 12/31↓ 1/1↓ Oldest | Source | Subject | Draw: Graph | ✓ Tech BarChart | Print... | Similar Docs |

☐ Rank: 1 / Rel: 95%    [Results] [Next →]    [Summary]

DOCUMENTUM and IBM Announce Remarketing Agreement and Launch New Alliance To Deliver Knowledge Management Solutions For Multiple Industries
Business Editors and Computer Writers • *BUSINESS WIRE*
03/17/98

Most Relevant Section
Document Citation
715

705

PLEASANTON, Calif.--(BUSINESS WIRE)--March 17, 1998-- DOCUMENTUM(R) Inc., (NASDAQ:DCTM) a worldwide leader in enterprise document and knowledge management solutions for client/server and Web environments, and IBM Corp. (NYSE:IBM) today announced a software remarketing agreement and an expanded solution marketing alliance.

The agreement enables IBM to remarket the DOCUMENTUM Enterprise Document Management System (EDMS) on a global basis. In addition, IBM is introducing industry-specific knowledge management solutions, IBM EDMSolutions(TM), for the DOCUMENTUM platform. These IBM solution products are targeted to a range of industries including oil and gas, chemical, utilities, pharmaceutical, telecommunications, automotive, aerospace and financial services. This new series of IBM EDMSolutions will be marketed globally.

Increasingly, major multinationals are focusing on knowledge management in order to effectively and efficiently exploit corporate and intellectual capital throughout their enterprise. The emergence of Web-centric and network technologies is facilitating rapid advances in knowledge management capabilities. DOCUMENTUM's EDMS applications facilitate the effective processing and sharing of pertinent documents and other knowledge-based assets in real-time, according to pre-established business process needs. This capability, combined with IBM's end-to-end consulting, network services and scalable server capabilities, facilitates comprehensive enterprise-wide knowledge management systems specific to individual industry needs.

IBM EDMSolutions will apply knowledge and document management tools to address key business issues such as environmental health and safety compliance, records management and retention, global printing and publishing, and quality assurance and compliance. These new solutions enable customers to integrate IBM and DOCUMENTUM offerings based around the Web, enterprise resource planning (ERP) implementations, and innovations in knowledge management.

"The business benefits we are able to deliver with DOCUMENTUM and EDMSolutions are at the heart of the issues that keep corporate management awake at night," said Douglas Neary, IBM EDM Solutions and Services Worldwide Executive. "Because of IBM's global customer reach, our deep level of experience in delivering

*FIG. 7.*

COMPUTER USER INTERFACE FOR GRAPHICAL ANALYSIS OF INFORMATION USING MULTIPLE ATTRIBUTES

FIELD OF THE INVENTION

This invention relates generally to computer information systems, and ore specifically, to a system for analyzing information on a computer utilizing a graphical structure on a visual display.

BACKGROUND OF THE INVENTION

The proliferation of computer systems and improvements in telecommunications makes an overwhelming amount of information available to a computer user. Massive networks such as the Internet provide millions of data items in the form of words, numbers, images, etc., in very diverse and unregulated formats. Other, smaller information systems, such as intranets and stand-alone computer systems, are more restrictive in their data formats yet still provide large volumes of information to the user. Perhaps the smallest application of a computerized information system is with today's so-called personal digital assistants (PDAs), which may contain an individual's address book, calendar or similar personal information.

Within the range of all of these information systems lie the same basic problems of efficient access to, and analysis of, the information. Typical user applications are designed primarily to provide ease of entry, upkeep and retrieval. However, the applications require that the information system be specifically designed for a target application, e.g., medical record-keeping, so that "records," "templates," or similar structures must be designed by a programmer or architect in order for the application to be usefull to an end user.

More recently, popular search engines have been created which allow users to search larger, less-structured information systems such as the Internet with relational query operators. For example, some Internet search engines allow relational queries using keywords that do not relate to specific fields. Instead, any documents having words with a specified relationship, such as a keyword matching relationship, are listed as possible documents of interest to the user.

FIG. 4 shows a prior art screen display of a search result 400 derived from a keyword search conducted over the Internet. As can be seen, the search result 400 comprises a series of document citations such as shown at 402. Citations in the search result 400 are displayed in order of decreasing confidence factors 405. The confidence factors represent how well the documents satisfied the search criteria. For example, if three search terms were used to form the search criteria, a document that satisfies all three search terms would have a confidence factor of 100%. If only two of three search terms were satisfied, the confidence factor would be 66%. In FIG. 4 as shown at 404, the search engine found 92 documents having one or more of the keyword search terms. As can be seen, the documents have a document number 410 which ranks the documents by their associated confidence factors. Of the 92 documents, only 8 citations are displayed on the screen at any one time due to the constraints of the display system. When a larger display or a smaller character font is used, more than 8 citations may be displayed, however, all 92 citations would generally not fit onto one display screen. Printing out the 92 citations on a standard printer may require several pages of print out. As a result, it becomes difficult to analyze large search results because of the limitations inherent in current display techniques.

Another use for information systems is to provide a platform for analyzing data to determine characteristics, trends or predictive guidelines in the information. For example, when financial data is being analyzed it may be useful to discover that where inflation is high in an overseas market, bond prices in a different market are also correspondingly high. Or, in a medical research application, it would be useful to determine that in a large percentage of cases where a certain treatment was used the recovery time was very short. However, such analysis of data is very difficult with traditional search displays, such as typically used on the Internet, which singularly focus on retrieving all existing information that match a simple query and displaying the result without regard for how the user may want to interpret it.

As discussed above, query searches as described, when performed on a large information system such as the Internet, may result in the retrieval of hundreds of documents. Because of the limitations in current display techniques, the job is then left to the user to filter through this large result to find documents of interest. Therefore, unless the user knows with high specificity the type of information sought, and can form very specific search criteria, a large and virtually unusable search result can be created.

Thus, it is desirable to have a technique and system for analyzing characteristics of information in the manner discussed above. Further, it is desirable to have such a technique and system that is usable with search results regardless of the size or level of structuring. Also, given the vast amount of information available, it is vital that the results of the analysis system be presented in a form that is efficient for detecting trends, qualities or other useful relationship among the information being analyzed.

SUMMARY OF THE INVENTION

A method and apparatus for efficiently analyzing information on a computer is provided. The information is organized based on any user selectable attributes and displayed in graphical form on a computer display screen. By viewing the information in graphical form, a user can quickly analyze the information to determine trends or qualities. In addition, the graphical form provides a way for the user to quickly identify the information items most relevant to specific criteria.

In an embodiment of the invention, a method for analyzing information on a computer system having a processor, display screen and a user input device is provided.

The information includes a plurality of information items, wherein each information item has a first attribute and a second attribute. The method comprises the steps of grouping the information items into groups by the first attribute; representing each of the information items in the groups by a screen icon, wherein a characteristic of the screen icon is a function of the second attribute; defining a first display window on the display screen; and displaying a graphical representation of the information in the first display window, wherein the information is displayed as a graphical representation based on a function of the screen icons and the groups.

BRIEF DESCRIPTION OF THE DRAWINGS

FIG. 4 shows a "Pior Art" computer search output;

FIG. 7 shows a detailed description display screen in an embodiment of the present invention;

DESCRIPTION OF THE SPECIFIC EMBODIMENTS

Figure 1:
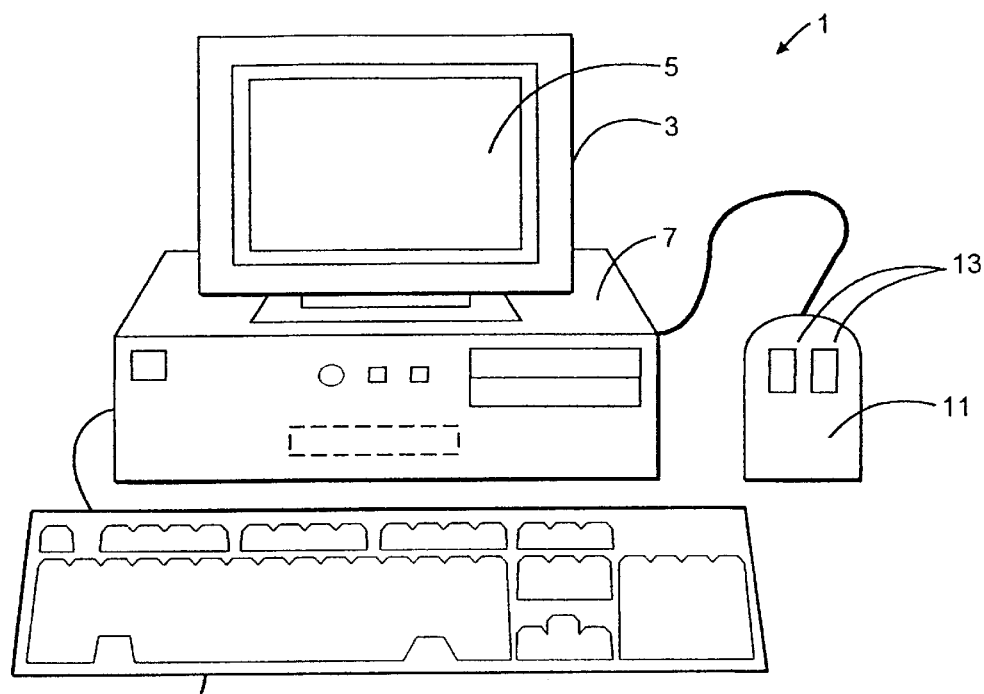
FIG. 1 shows a basic computer system suitable for executing the software of the present invention.

FIG. 1 shows a basic computer system 1 suitable for executing the software of the present invention. Computer system 1 includes a display device 3 with a display screen 5. Cabinet 7 houses additional components of the computer system (not shown) such as a processor, memory, disk drive, compact disc read only memory (CD-ROM), etc. Keyboard 9 and mouse 11 are standard user input devices. Mouse 11 includes buttons 13 for facilitating user input.

Figure 2:
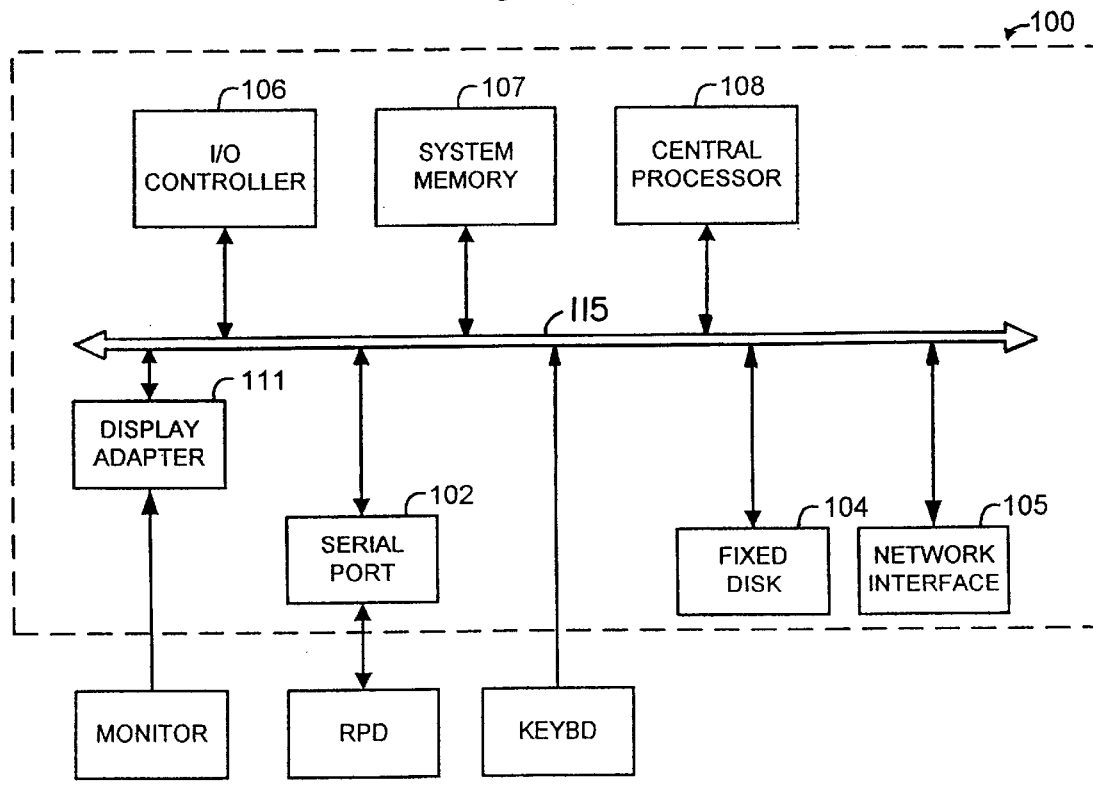
FIG. 2 shows subsystems in the computer system of FIG. 1.

FIG. 2 shows several subsystems interconnected via a bus 115. Central processor 108 communicates with system memory 107, fixed disk 104, I/O controller 106, display adapter 111, serial port 102 and network interface 105. Some of the subsystems interface to user input and output devices such as the monitor, remote pointing device (RPD) or, "mouse," and keyboard which are also shown in FIG. 1. Network interface 105 is used to connect the computer system to external computer systems on a network. Many other configurations of subsystems are possible. A computer system suitable for use with the present invention can use less subsystems, components or devices than those shown in FIG. 2. For example, a handheld computer may include only a processor, memory (both random-access memory (RAM) and read-only memory (ROM)), small display screen and keyboard. Also, computer systems suitable for use with the present invention may include more subsystems than are shown in FIG. 2. For example, the handheld computer may include a PCMCIA card interface for storing and retrieving data from an external card.

Figure 3:
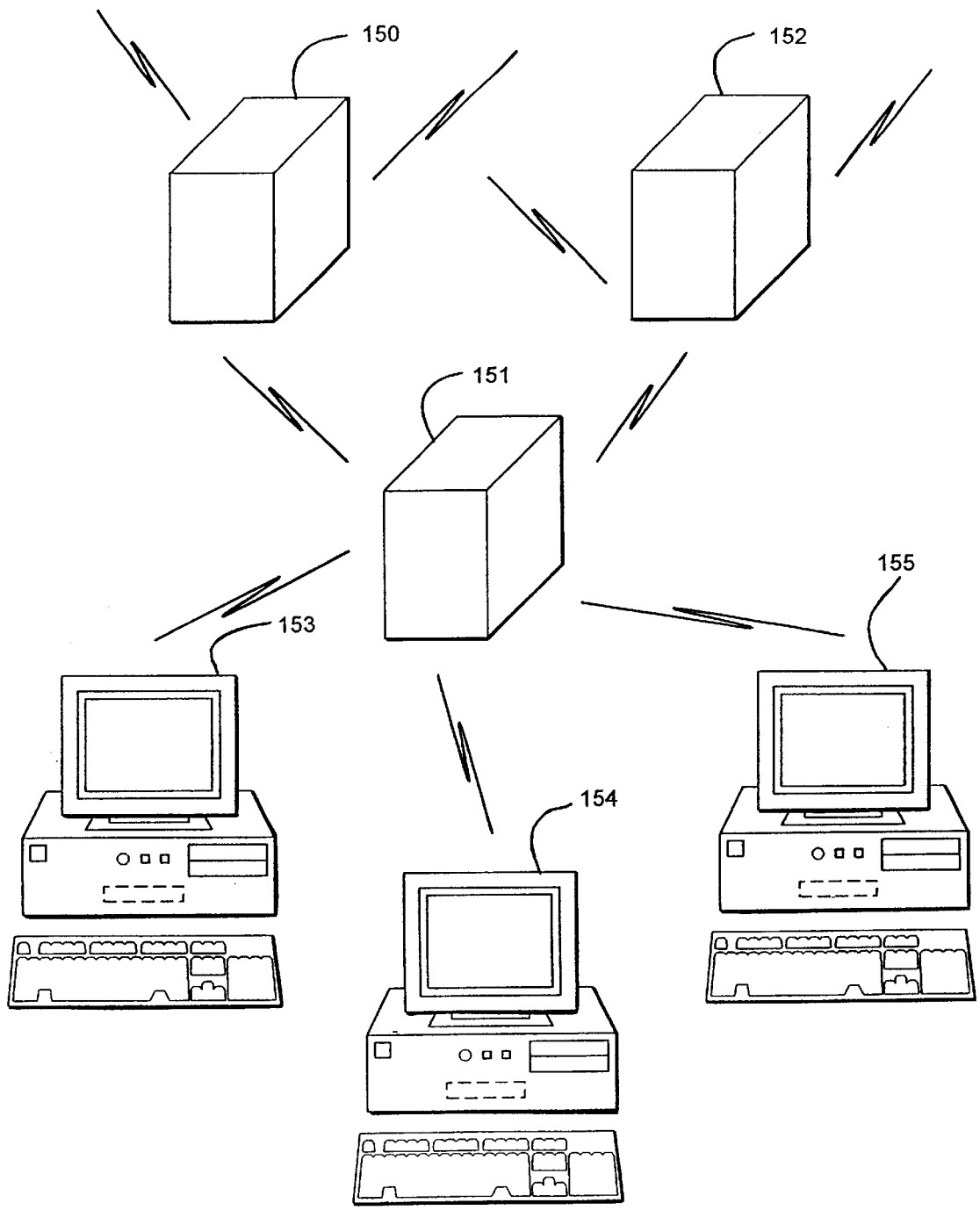
FIG. 3 shows a generalized computer network.

FIG. 3 shows a generalized computer network having servers such as server 150, 151 and 152 that may be interconnected by any communication means and in any network topology. For example, the servers can be connected by hardwire, radio frequency transmissions or infrared transmissions. They can be connected in a star, ring, daisy chain, etc., schemes. Also, any communication protocol such as Ethernet, IEEE 1394 or TCP/IP can be employed.

User stations 153, 154 and 155 are shown connected to server 151. Again, the interconnection between the computer stations and the server, or servers, can be by any means, topology and protocol as is known. Although all of the computer stations are shown connected to server 151, additional servers having any number of additional computer stations can be added to the interconnected network of FIG. 3. Although a specific embodiment is discussed with reference to a single computer station, such as computer station 153 accessing information on a server such as server 151, it should be readily apparent that the information can be distributed over two or more servers or computers. Further, the information can exist partially, or completely, on the computer stations themselves. That is, computer station 153 can operate as a stand-alone analysis system wherein the analysis engine, along with the data, auxiliary programs, etc. all reside within the computer station. Many variations on distributing data, and many designs of "front ends" or user interfaces are possible without deviating from the scope of the present invention.

A preferred embodiment of the present invention executes as software on a workstation. The workstation can typically contain information to be analyzed, or alternatively, the workstation can be connected to a network and the information can be remotely located or downloaded to the workstation. The information may comprise virtually any type or structure and may comprise one or more attributes. For example, the search result 400 of FIG. 4 comprises citation data where each citation has a date attribute, a title attribute and so forth. The information may also comprise any type of database and database structure. During analysis of the information, the user operates the software via the user input devices. Output is presented to the user through the display screen or by other methods such as hard copy output from a printer. It should be apparent that, although not directly discussed here, many types of user input and output devices are suitable for use with the present invention. For example, a trackball, digitizing tablet, light pen, data glove, etc. can all be used to provide input to the software.

Figure 5:
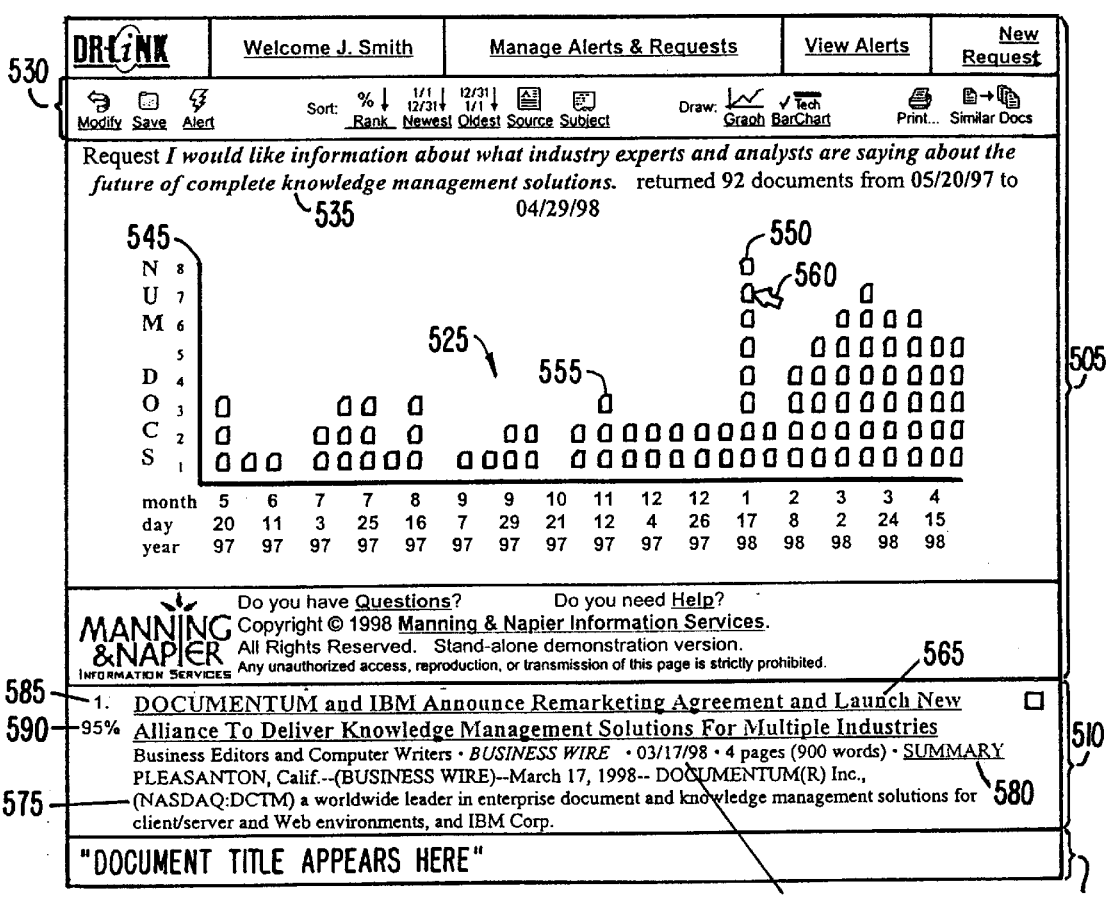
FIG. 5 shows an analysis display screen in an embodiment of the present invention.

FIG. 5 shows an analysis screen 500 wherein the information can be analyzed utilizing an embodiment of the invention. Although many types of information may be analyzed, for convenience and clarity, it will be assumed that search result 400 is the information to be analyzed. The analysis screen 500 contains three display windows. The windows are positioned so that a first window, known as the graphical window 505, is located at the top portion of the analysis screen. A second window, known as the citation window 510, is located below the first window. A third window, known as the status window 520, is located below the second window and substantially at the bottom of the analysis screen 500. It should be noted that the display window's location and size may be adjusted to individual preferences without affecting the operation of the embodiment of the invention.

The graphical window 505 shows a graphical representation 525 of the search result 400. Graphical window 505 also comprises additional graphics and text information describing the search parameters and the search results. For example there is an analysis tool bar 530, wherein the user may select from various tool icons representative of additional functions that may be performed on the search result. The requested search text 535 is also displayed allowing the user to see the search criteria used to produce the search result 400.

In the preferred embodiment, X-Y graph 525 is used to display the search result 400. In the graph 525, the x-axis 540 depicts time intervals ranging from the date of the earliest publication date in the search result to the date of the latest publication date in the search result. This range is divided approximately evenly into 32 subranges to produce the scale for the x-axis. As a result of defining the 32 subranges, each of the records of the search result can be fit into one of these 32 subranges. Any number of subranges can be used, for example, the search result can be analyzed in smaller portions wherein a smaller time interval would be defined and correspondingly, the 32 subranges would define smaller time intervals. In another embodiment, the x-axis may be divided by another criteria or element common to the search result. For example, the author's last name may be used to group the documents in the search result. In another embodiment, the country of origin of the document may be used. Virtually any aspect of the search result can be used to group the documents and define the x-axis.

Graph 525 also shows a y-axis 545 of the X-Y graph 525. The y-axis 545 depicts count values which represents the number of documents in the search result contained within any one of the 32 subranges. The y-axis count value is scaled to range from 0 to the maximum number of documents contained within any of the subranges. For example, there are eight documents grouped in the subrange labeled Jan. 17, 1998 as shown at 550. This is the most documents within any of the subranges, therefore the y-axis 545 will be scaled to have a range of 0 to 8. However, display of the y-axis scale is only for completeness and is not necessary to use the embodiment of the present invention.

For display purposes, each of the documents in the search result are represented by a document icon 555. The document icon can be any shape or image that can be formed on the display, such as a small picture of a document, a shape which represents a document or even a text character or numeral used to represent the document. The documents in each x-axis subrange are displayed as a column of the document icons. Documents having satisfied the most search terms are considered the most relevant, i.e. have a higher confidence factor, and are positioned higher in the column than documents satisfying fewer search terms. Additionally, the icons are coded by their respective confidence factor. For example, the icons may be color-coded or gray scaled based on their confidence factor or may be represented by sequential text, characters or numerals or other shapes representative of their respective confidence factors. In the preferred embodiment, a gray scale code is used wherein darker icons represent documents having higher confidence factors, and hence, are more relevant to the user. These documents are located higher in the column than documents with lower confidence factors and having lighter icon color. As a result the user may visually determine several characteristics of the search result. For example, the user can look at the X-Y graph 525 and easily determine which group of all the groups contain the documents with the highest confidence factors. Also, groups having the most number of document icons indicate a high level of activity relevant to the search criteria One can also easily determine for any group which documents are the most relevant by their location in the column. Documents at the top of the column have a higher confidence factor and are considered more relevant to the user, while documents toward the bottom of the column are considered less relevant.

Thus, by simply viewing the graph 525 the user is able to determine a variety of information about a large number of documents which might otherwise not be possible with typical document listings or only possible after excessive manipulation of the search result. It should be obvious to those skilled in the art that although an X-Y plot is used in the present embodiment, other types of graphical representations may be used, such as Pie charts, bar graphs and multidimensional plots, to represent the data of the search result in a similar fashion.

Referring again to FIG. 5, the status window 520 is used to provide feedback to the user relative to the position of a screen cursor 560. As the user moves the screen cursor around the display, information in the status window changes dynamically based on the cursor's position. For example, in FIG. 5. screen cursor 560 is shown pointing to an icon in the graphical representation of the search result. Information about the document represented by the selected icon, such as the title, is shown in the status window 520. Based on the user's preferences, other types of information contained in the search result may be defined as status information and displayed in the status window.

As the screen cursor 560 is moved around graph 525, the status window 520 is dynamically updated with status information regarding any of the icons being pointed to. This allows the user to quickly move around the graph and see the defined status information for any icon. Additionally, the status display window could be repositioned or resized according to user's preferences.

The citation window 510 is used to quickly access additional information about the documents in the search result. In one method of browsing, when the user passes the screen cursor 560 over a document icon, the title will appear in the status display 520. By clicking, a mouse button for example, on the selected icon, citation information about the selected document will appear in the citation window 510. The citation information comprises information such as the title 565, date 570, stock information 575 and a summary link 580. The information contained in the citation may also include the document rank 585 and the confidence factor 590. It should be noted that depending on the user's preferences, the data displayed in the citation window could contain any of the information in the search result 400.

Figure 6:
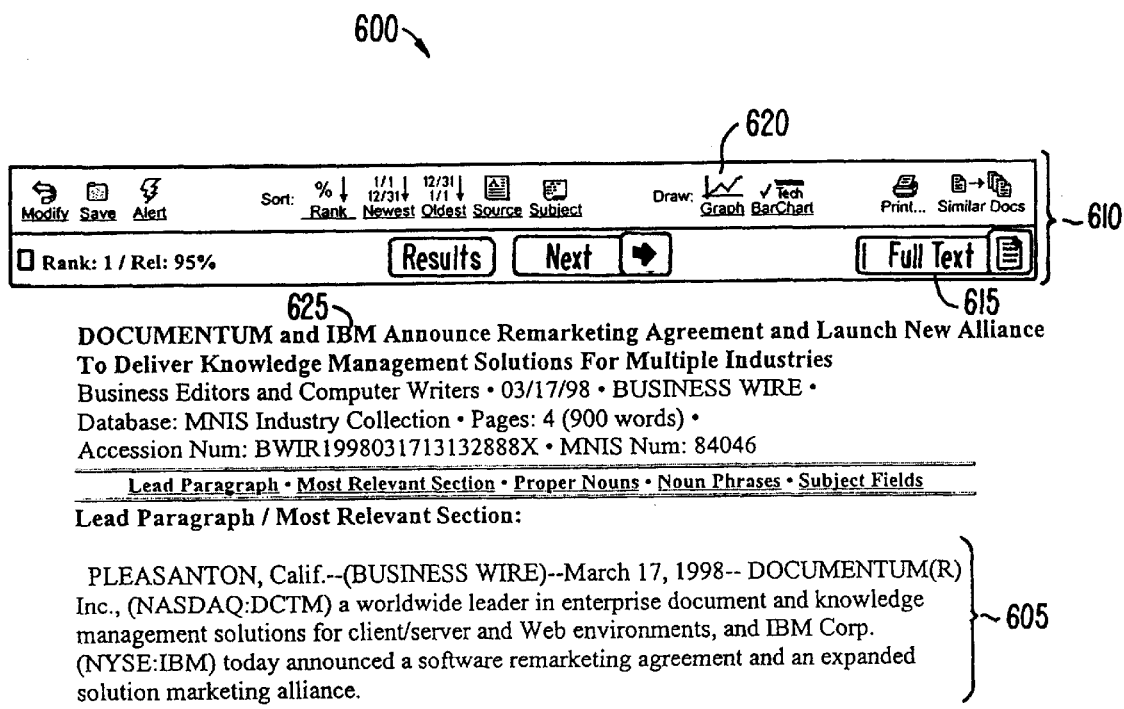
FIG. 6 shows a summary display screen in an embodiment of the present invention.

FIG. 6 depicts a summary window 600 for use in another method of browsing according to the teachings of the present invention. The user can click on the summary link 580 in the citation window 510 to open the summary window 600. Summary window 600 contains a summary 605 of the selected document. Also included in the summary window 600 is a tool bar 610 where the user may select from additional functions. Again, it should be noted that depending on the user's preferences, the data displayed in the summary window could contain any of the information in the search result. From the summary window 600 the user may see the full text of the summarized document by clicking on either a title link 625 or on a full text button 615 located on the tool bar 610. The user may also return to the analysis screen 500 by clicking on a graph button 620 also located on the tool bar 610.

FIG. 7 depicts a detailed description window 700 for use in another method of browsing according to the teachings of the present invention. The user can click on the title link 565 in the citation window 510 to open the detailed description window 700. The detailed description window 700 contains the selected document's full text 705. In general the complete set of information relative to the selected icon would be displayed in the detailed description window, however, depending on the user's preferences, less than all information may be displayed. Also included in the detailed display window is a tool bar 710 where the user may select from additional functions to perform. For example, the user may go to the summary window 600 by clicking on a summary button 715 located on the tool bar 710. Additionally, the user may return to the analysis screen 500 by clicking on a graph button 720 also located on the tool bar 710. After return to the analysis screen 500, the user may select another icon in which to view information about or may exit the information analyzer by clicking on the appropriate icon in the toolbar 530 at the top of the analysis screen 500.

Figure 8:
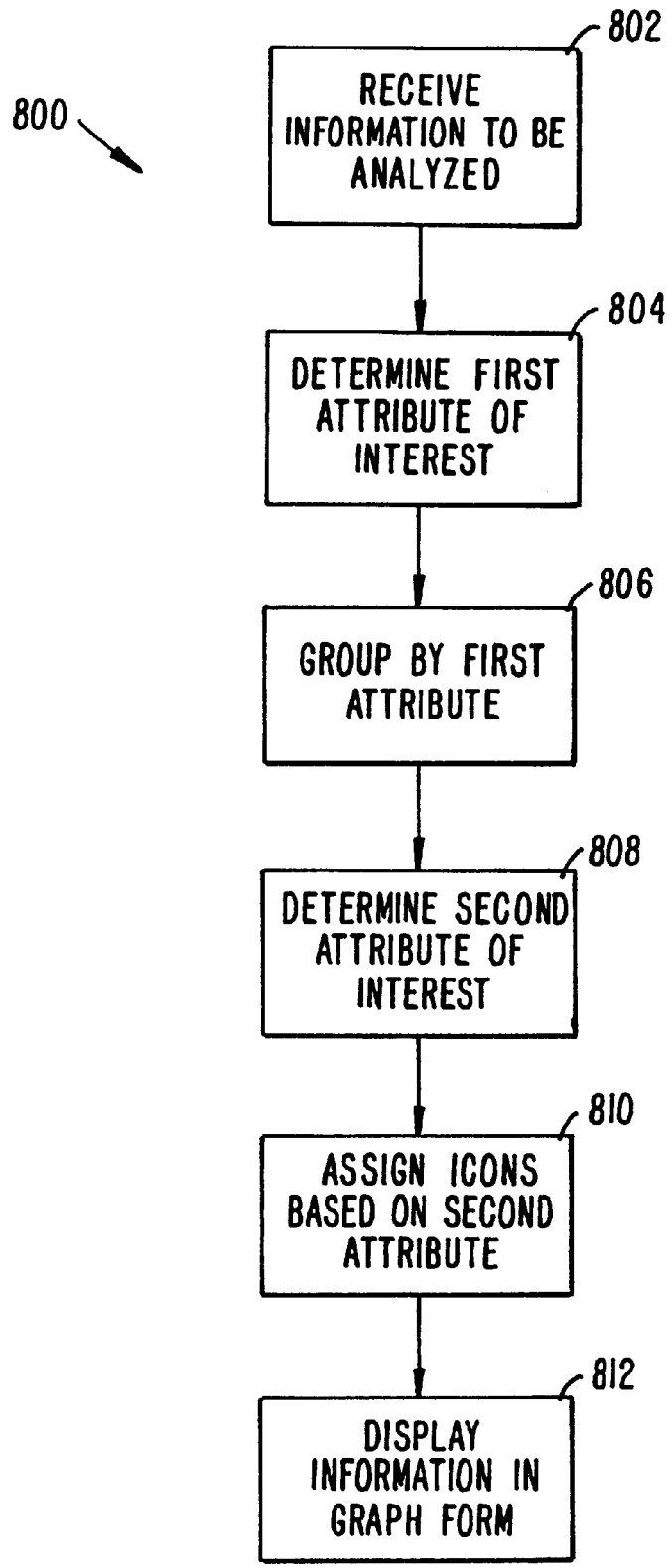
FIG. 8 illustrates a flow diagram depicting a method of analyzing information in accordance with the present invention.

FIG. 8 illustrates a method 800 of analyzing information in accordance with the teachings of the present invention. At step 802 information to be analyzed is received. The received information may be downloaded from a network or may exist on a local computer as previously described. The information consists of a plurality of information items, for example, a plurality of document citations. At step 804 the user selects a first attribute within the information items to be analyzed. The first attribute may be a publication date, author's name or other attribute of interest to the user. At step 806 the information items are organized by the first attribute into groups. At step 808 the user selects a second attribute within the information items to be analyzed. The second attribute may be a confidence factor or other attribute of interest to the user. At step 810 screen icons are assigned to the information items in each of the groups based on the second attribute. For example, if the second attribute is a confidence factor, the screen icons may be gray-scaled according to confidence factor and assigned to the information items. At step 812 the information items are displayed in a graphical representation as a function of the groups and the screen icons.

Figure 9:
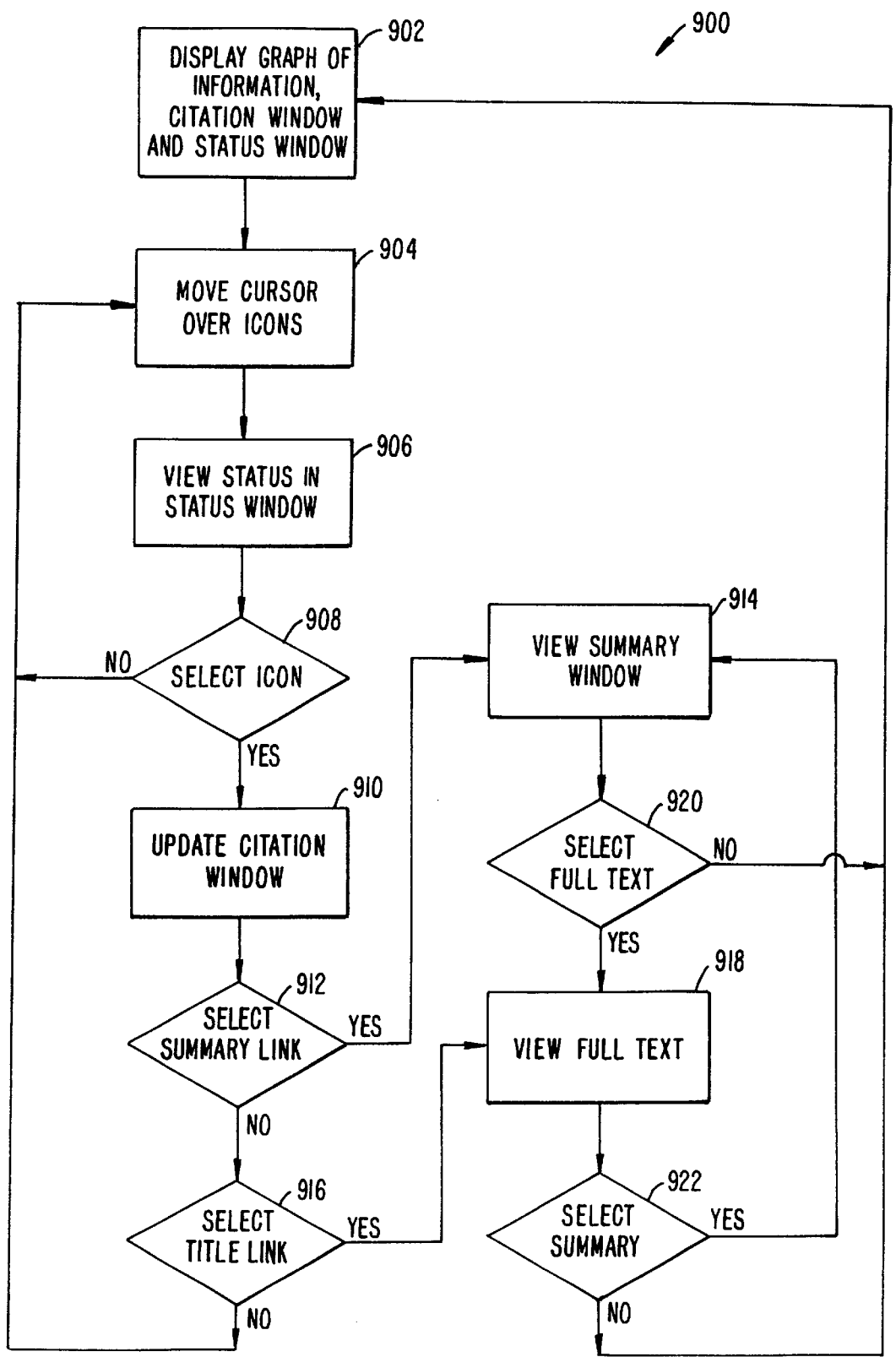
FIG. 9 illustrates a flow diagram depicting a method of viewing analyzed information in accordance with the present invention.

FIG. 9 illustrates a method 900 of viewing analyzed information in accordance with the teachings of the present invention. Although a particular method will be discussed it will be apparent to those of skill in the art that other methods of viewing the analyzed information are possible without deviating from the scope of the present invention.

At step 902 a graph of the information items are displayed as determined from step 812 of FIG. 8. Essentially, this is the display of the analysis screen 500 of FIG. 5. At step 904 the user may move the cursor to point to icons displayed in the analysis window to find an information item of interest. At step 906 the status window 520 can be used to view status information about an information item currently pointed to. At step 908 the user has the option to select an information item by pointing to its icon and clicking a mouse button. If the user decides not to select an icon, then the 'no' branch is selected and the user returns to step 904 and may continue to move the cursor around the analysis screen 500 to view status information about pointed to icons. If the user decides to select an icon, for example by clicking on icon 560, then the 'yes' branch is selected and the user proceeds to step 910.

At the step 910 the citation window 510 is updated with the citation information regarding the icon selected by the user in step 908. At step 912 the user may select the summary link 580 of the citation window 510, to see summary information about the selected icon. If the user selects the summary link then the 'yes' branch is selected and summary information can be viewed at step 914. If the user does not select the summary link, then the method continues at step 916 where the user may select the title link 565 to see all the information of the selected icon. In the case of documents, the full text of the document could be displayed. If the use selects the title link then the 'yes' branch is selected and the full view of the text would be displayed at step 918. If the user does not want to see the full text the 'no' branch is followed where user may return to step 904 to select other icons of interest.

Referring again to the step 914, the user may view the summary information utilizing the summary window 600 of FIG. 6. At step 920 the user may select to see the full text of the selected icon by clicking on the full text button 615 and thus following the 'yes' branch to step 918. However, the user may also return to the analysis screen 500 by selecting the graph button 620 and thus returning to the step 902.

Referring again to the step 918, the user may view the full text by using the full text display window 700 of FIG. 7. At step 922 the user may select to see the summary information of the selected icon by clicking on the summary button 715 and thus following the 'yes' branch to step 914. However, the user may also return to the analysis screen 500 by selecting the graph button 720 and thus returning to the step 902. Although the method 900 is presented it will be apparent to those of skill in the art that many methods of moving through and around the analysis and display screens of the present invention are possible without deviating from the scope and spirit of the invention.

Thus a method for the display and analysis of information has been presented. Although the invention has been discussed with respect to specific embodiments, many modifications to the specific embodiments are possible without deviating from the invention, the scope of which is determined solely by the appended claims.

What is claimed is:

1. A method for analyzing information on a computer system, said computer system having a processor, display screen and a user input device, said information comprising a plurality of information records, wherein each information record comprises a first attribute and a second attribute, said method comprising the steps of:

grouping the plurality of information records by the first attribute into information groups;

assigning each information record a screen icon, so that each of the information records is assigned a separate screen icon;

defining a first display window on the display screen;

assigning a count value for each of the information records in said information groups; and displaying a graphical representation of the information in said first display window, wherein the information is displayed as an X-Y graph of the information in said first display window, wherein x-axis values represent said information groups and y-axis values represent said count values, and wherein said screen icons are displayed on said X-Y graph as a function of said information groups and said count values.

2. The method of claim 1 wherein the first attribute is a date value and said step of grouping comprises a step of grouping the plurality of information records by said date value into the information groups.

3. The method of claim 1 wherein said second attribute is a confidence factor and said step of assigning comprises a step of assigning each information record said screen icon, wherein said screen icon is representative of said confidence factor.

4. The method of claim 3 wherein said step of assigning comprises a step of assigning each information record said screen icon, wherein said screen icon has a display color representative of said confidence factor.

5. The method of claim 1 further comprising steps of:

defining a second display window on the display screen; and displaying a first set of information about a selected information record within said second display window responsive to an input from the user input device.

6. The method of claim 5 wherein the user input device comprises a mouse device coupled to a displayable screen cursor and said step of displaying comprises steps of:

moving said mouse device so that said displayable screen cursor appears over a selected screen icon representative of said selected information record; and displaying said first set of information about said selected information record within said second display window.

7. The method of claim 1 further comprising steps of:

defining a second display window on the display screen; and displaying a first set of information about a selected information record within said second display window responsive to a first input from the user input device.

8. The method of claim 7 wherein the user input device comprises a mouse device coupled to a displayable screen cursor and having at least one user operable button and said step of displaying a first set of information comprises steps of:

moving said mouse device so that said displayable screen cursor appears over a selected screen icon which is representative of said selected information record depressing said at least one button; and displaying said first set of information about said selected information record within said second display window.

9. The method of claim 7 further comprising a step of displaying a second set of information about said selected information record within a third display window responsive to a second input from the user input device.

10. The method of claim 9 wherein said step of displaying a second set of information comprises steps of:

moving said mouse device so that said displayable screen cursor appears over an information link in said second display window;

depressing said at least one button;

defining a third display window on the display screen; and displaying said second set of information about said selected information record within said third display window.

* * * * *